United States Patent Office 3,454,421
Patented July 8, 1969

3,454,421
FABRIC IMPREGNATED WITH POLYEPOXIDE-POLYFUNCTIONAL AMINE CONDENSATE
Howard L. Westbrook, North Plainfield, N.J., assignor to Shell Oil Company, New York, N.Y., a corporation of Delaware
No Drawing. Filed Dec. 27, 1966, Ser. No. 604,587
Int. Cl. B32b 27/12, 27/38, 27/34
U.S. Cl. 117—126
10 Claims

ABSTRACT OF THE DISCLOSURE

A fibrous material impregnated with a liquid mixture of (1) an acetone soluble, highly reactive, epoxy-containing condensate of (a) a polyepoxide having more than 1 vic-epoxy group, and (b) a polyfunctional amine possessing more than two active hydrogen attached to amino nitrogen, and (2) an epoxy curing agent different from the polyfunctional amine in the condensate.

---

This invention relates to laminated products and their preparation. More particularly, the invention relates to new laminated products prepared from special condensates of polyepoxides and certain amines.

Specifically, the invention provides new and particularly useful reinforced laminated products having improved elevated temperature flexural strength, solvent resistance and heat resistance, which products are prepared by impregnating a base material, such as glass cloth, with a varnish solution containing a condensate of (1) a polyepoxide possessing more than one vic-epoxy group, and preferably a glycidyl polyether of a polyhydric phenol, and (2) a polyfunctional amine possessing more than two active hydrogen attached to amino nitrogen, such as, for example, methylene dianiline, said condensates having a softening point of at least 50° C. and a WPE of at least 300, and an epoxy curing agent, and preferably dicyandiamide, and then curing the resulting composition, preferably by heat and pressure.

Polyepoxides, such as commercially available glycidyl ethers of polyhydric phenols, have been used with considerable success in the past in the preparation of laminates, adhesives, powdered coatings and the like. Those used in these applications, however, have been limited in the past months because of the trend toward more heat resistant products and faster curing systems. The laminates prepared from these resins, for example, fail to retain a great part of their strength at the elevated temperature of 225–250° F. In addition, the systems fail to cure at elevated temperatures in a matter of a few minutes which shortened time is required for many new assembly line coating applications.

It is an object of the invention, therefore, to provide new laminated products and a method for their preparation. It is a further object to provide new reinforced laminated products prepared from special condensates of polyepoxides and amines. It is a further object to provide new reinforced laminated products having improved elevated temperature flexural strength. It is a further object to provide new reinforced laminated products having excellent solvent and heat resistance. It is a further object to provide new reinforced laminated products which can be prepared at a fast rate. It is a further object to provide a laminating system that has a shorter advancement time. It is a further object to provide a laminating process which requires a shorter press time to obtain desired properties. It is still a further object to provide a laminating process which is less affected by humidity. These and other objects of the invention will be apparent from the following detailed description thereof.

It has now been discovered that these and other objects may be accomplished by the new reinforced laminated products of the invention which are prepared by impregnating a base material, such as glass cloth, with a varnish solution containing a condensate of (1) a polyepoxide possessing more than one vic-epoxy group, and preferably a glycidyl polyether of a polyhydric phenol, and (2) a polyfunctional amine possessing more than two active hydrogen attached to amino nitrogen, such as, for example, methylene dianiline, said condensates having a softening point of at least 50° C. and a WPE of at least 300, and an epoxy resin curing agent, and preferably dicyandiamide, and then curing the resulting composition, preferably by heat and pressure. It has been surprisingly found that composite products prepared by the above method can be easily cured to form laminated products having outstanding heat resistance and retention of strength at elevated temperatures. In addition, the products have excellent chemical and solvent resistance. Further advantage is found in the fact that this technique has a shorter advancement time (i.e., time needed to reach the B stage), shorter press time and is less affected by humidity. The products are thus ideally suited for making heat resistance products for space vehicles, airplanes, and the like. The superior results are illustrated in the working examples at the end of the specification.

The condensates used in making the laminated products of the invention are prepared by mixing and reacting a polyepoxide with a polyfunctional amine in controlled proportions. The polyepoxide that can be used in the process comprise those organic materials which have more than one vic-epoxy group, i.e., more than one

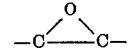

group, which group may be in a terminal position, i.e., a

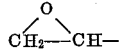

group or in an internal position, i.e., a

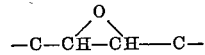

The polyepoxides may be saturated or unsaturated, aliphatic, cycloaliphatic, aromatic or heterocyclic and may be substituted with substituents, such as chlorine, hydroxyl group, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4 - bis(2,3-epoxypropoxy)cyclohexane, 4,4' - bis(2-hydroxy-3,4'-epoxybutoxy) diphenyl dimethylmethane, 1,3-bis(4,5-epoxypentoxy)-5-chlorobenzene, 1,4 - bis(3,4-epoxybutoxy)2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenol)butane, 4,4′ - dihydroxybenzophenone, bis(4-hydroxyphenyl)ethane, 2,2 - bis(4 - hydroxyphenyl)pentane and 1,5-dihydroxynaphthalene. The halogen-containing epoxides may be further exemplified by 3-chloro-2,3-chloro-1,2-epoxybutane, 3-bromo - 1,2 - epoxyhexane, 3-chloro-1,2-epoxyoctane, and the like. By varying the ratios of the phenol and epichlorohydrin one obtains different molecular weight products as shown in U.S. 2,633,458.

A preferred group of the above-descrbed epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for seven hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxy polyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetrio, sorbitol, mannitol, pentaerythritol, polyallyl alcohol, polyvinyl alcohol, insoitol, trimethylolpropane, bis(4-hydroxycyclohexyl)-dimethylmethane and the like.

The preparation of suitable polyepoxide polyether is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups, include among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)-ocalate, di(2,3 - epoxyhexyl)succinate, di(2,3 - epoxyoctyl)tetrahydrophthalate, di(4,5-epoxydodecyl)maleate, di(2,3-epoxybutyl)tetephthalate, di(2,3 - epoxypentyl)-thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3 - epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4 - epoxyhexyl 3,4 - epoxypentanoate, 3,4 - epoxycyclohexyl 3,4 - cyclohexanoate, 2,3-epoxycyclohexylmethyl 2,3-epoxycyclohexanoate, and 3,4-epoxycyclohexyl 4,5-epoxyoctanoate and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidizer derivatives of polyethylenically unsaturated polycarboxylic acids, such as, for example, dimethyl 8,9,11,13-diepoxyeicosanddioate, dibutyl 7,8,11,12-diepoxyoctadecanedioate, dioctyl 10,11 - diethyl - 8,9,12,13 - diepoxyeicosanedioate, dicyclohexyl 3,4,5,6 - diepoxycyclohexanedicarboxylate, dibenzyl 1,2,4,5 - diepoxycyclohexane - 1,2 - dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight between 100 and 4,000 are preferred. Polyepoxides having an average molecular weight between 400 to 1,000 are particularly preferred.

The other component to be used in making the special condensates is a polyfunctional amine possessing more than two hydrogen attached to amino nitrogen. The amino nitrogen are preferably attached to aromatic ring or rings. Examples of the amines include, among others, methylene dianiline, meta-phenylene diamine, hexamethylene diamine, 1,2,5-triaminobenzene, 4,4′-diaminophenylsulfone, 4,4′-diaminophenylpropane, 4,4′-diaminodiphenylethane, and the like, and mixture thereof. Particularly preferred amines to be used include the aromatic primary polyamines preferably aromatic diamines possessing amino nitrogen attached to aromatic rings, 4 amino hydrogen and containing from 6 to 24 carbon atoms.

A portion of the above-noted polyfunctional amine can be replaced with less functional amines, such as those possessing 2 or less amino hydrogen. Examples of these includes, among others, aniline meta-aminophenol, cyclohexylamine, cyclopentylamine, allyl amine, octylamine, 2-amino-4-methoxybenzene, 2-amino-4-chlorobenzene and the like, and mixture thereof. Preferred members of this group include the primary aliphatic, cycloaliphatic and aromatic monoamines containing up to 24 carbon atoms. In general, up to 70% of the polyfunctional amine can be replaced by these less functional amines, but preferably from .5% to 40% of the polyfunctional amine is so replaced with the less functional amines.

The condensates are prepared by combining one or more of the above-described polyepoxides with one or more of the above-noted amines preferably in the presence of a catalyst. Preferred catalyst include the acid catalysts or acid acting catalysts. For aromatic amines the acids may be any inorganic or organic acid having an acidity (Ka value) of at least $10^{-3}$ to $10^{-6}$. Examples of these acid catalysts include, among others, salicylic acid, thioglycolic, monochloroacetic acid, benzoic, acetic, resorcinol, etc. When aliphatic or cycloaliphatic amines are employed, the catalysts employed may be weaker acidic materials. The amount of the catalyst employed will vary over a wide range. In general, amounts vary from about .1% to about 5% by weight of the reactants and more preferably from .5% to 4% by weight.

Water can also be utilized or a co-catalyst in the range of .1% to 5% by weight.

In order to obtain the desired adducts instead of gelled resinous masses which are useless for the present purpose, it is necessary that an important detail be observed, namely, that a proper proportion of a reactant be used. The equivalent excess of the polyepoxide should vary from about .33 to .033 equivalent. By chemical equivalent amount as used herein is meant that amount needed to furnish one epoxide group for every amino hydrogen. Also the amount of polyepoxide and amine used should be such that the total over-all average functionality of reactants should be between 2 and 2.5. This over-all functionality can be determined by the following equation:

$$\frac{\frac{(X)(WX)}{(MX)}+\frac{Y(WY)}{(MY)}+\cdots *}{\text{Total number of moles per 100 grams of reactants}} = 2 \text{ to } 2.5$$

X=number of epoxy groups per mole of the polyepoxide.
MX=molecular weight of the polyepoxide.
WX=weight percent of total reactants of polyepoxide.
Y=number of amine hydrogen atoms on amine molecule.
MY=molecular weight of the amine.
WY=weight percent of total reactants of amine.

*If more than one amine or polyepoxide is used, the equation should be continued with the same information about that reactant.

The temperature employed in the formation of the adducts may vary from about 20° C. to 250° C. and more preferably from 20° C. to 150° C. It is generally preferred to initiate the condensation at a low temperature, e.g., ambient to 110° C. and allow it to exotherm to a temperature of 150° C. to 250° C. Cooling may be applied as needed. The period at the higher temperature should be as short as possible, e.g., 1 to 20 minutes, in order to avoid danger runaway reaction. The use of the acidic catalysts as noted above, permits one to use lower initiating temperatures. The reaction is preferably effected under atmospheric pressure although superatmospheric or subatmospheric pressure may be utilized as desired.

Solvents or diluents may be employed in the reaction if desired, but in most cases one or more of the reactants will be liquid and the mixing can be effected without the use of solvents. Suitable solvents if needed, include xylene, benzene, cyclohexane, dioxane, diethyl ether and the like.

The condensate may be recovered from the reaction mixture by any suitable means. If solvents or diluents are employed, they may be removed by evaporation, distillation, and the like. In the absence of such solvents or diluents, the adducts are generally recovered and used as the crude reaction product.

The condensates prepared by the process of the invention will be solid products having a softening point of at least 50° C., and more preferably 75° C. to 140° C. These softening points are determined by the Hercules method. The adducts will also have a WPE value of at least 300 and preferably 300 to 3,000. WPE is weight in grams of the condensate needed to supply 1 epoxy group. It is determined by a silver nitrate-HCl method. According to this method, the condensate is added to a solution of HCl in tetrahydrofuran wherein the epoxy groups react with the HCl. The solution is then back titrated with silver nitrate to determine unreacted HCl. A sample without the condensate is also titrated with $AgNO_3$. The calculation is determined by the formula:

$$\frac{\left(\begin{array}{l}\text{milliliters of}\\ AgNO_3 \text{ for}\\ \text{reagent sample}\end{array} - \begin{array}{l}\text{milliliters of}\\ AgNO_3 \text{ used for}\\ \text{sample containing}\\ \text{condensate}\end{array}\right)\left(\begin{array}{l}\text{Normality of}\\ AgNO_3\end{array}\right)}{\text{Weight of Condensate Sample (gms)}}$$

= X (milliequivalents) epoxy per gram of sample $$\frac{1(100)}{\frac{-(X)(100)}{1000}} = WPE$$

or $$\frac{1000}{(X)} = WPE$$

If all other conditions being equal, the lower the WPE the more reactive the adduct. Adducts having WPE over 625 are generally preferred when highly flexible products are desired.

The epoxy-containing adducts are to be cured with epoxy curing agents. Curing agents that can be utilized include, among others, amines, amino-containing polymers, polybasic acids, acid anhydrides, salts, mercaptans, hydrazines, $BF_3$ gas, $BF_3$ complexes, and the like, and mixtures thereof. Specific examples of such materials include, among others, p-phenylene diamine, diaminophenylsulfone, p,p'-methylene dianiline, p,p-diaminophenylmethane, triaminobenzene, 2,4-diaminotoluene, tetraaminobenzene, 3,3'-diamino diphenyl, 1,3-diamino-4-isopropylbenzene, 1,3-diamino-4,5-diethylbenzene, diaminostilbene, triethylamine ethylene diamine, diethylamine, diethylene triamine, triethylene tetramine, tetraethylene pentamine, pyridine, diaminopyridine, piperidine, N,N'-diethyl-1,3-propane diamine, dicyandiamide, melamine, fatty acid salts of amines, such as the 2-ethylhexoate of tris(dimethylaminomethyl)phenol adducts of polyepoxides such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydoxyphenyl)propane and diethylene triamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

A preferred group of catalysts include dicyandiamide, 3-amino pyridine and the imidazole compounds and their salt derivative, such as, for example, 2-methyl-4-ethyl imidazole, benzimidazole, imidazole lactate, imidazole acetate and the like.

Particularly preferred curing agents include dicyandiamide in combination with an amine, and preferably tertiary amine, accelerator. The amount of the curing agent employed will vary over a wide range depending on cure cycle desired, properties desired and economics. The amount of the curing agents having active hydrogen are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, $BF_3$, and the like are preferably used in amounts varying from about .1% to 6% by weight of the material being cured.

The laminated products of the invention are obtained by preparing a varnish containing the new condensates and curing agent and impregnating a base material with the said varnish. The varnish may be obtained by simply mixing the condensate with suitable solvents, such as acetone, methyl Cellosolve, methyl ethyl ketone, acetonitrile, benzene, cyclohexane, and the like, and mixtures thereof. Such solvents are employed so as to form a varnish having a workable viscosity for the intended application, such as dipping, spreading, spraying and the like.

The laminated products may be prepared from the varnish by any suitable technique. For example, they may be prepared by the technique known as filament winding. In this application the filaments, such as glass fibers are passed into and through the varnish composition and the treated fibers then wound on the desired mandrel or form and the formed unit allowed to cure by application of heat as noted below.

The product may also be a single or multiplayer laminated sheet material. In this application, the sheets of the fibrous base material are first impregnated with the above-noted varnish. The sheets may be impregnated with the varnish by any suitable method such as spreading the varnish on or by dipping or otherwise immersing the sheet in the impregnant. The solvent is conveniently removed by evaporation and the mixture then cured to the fusible resin state. Although this operation may be conducted at room temperature (20 to 25° C.), it is preferred to use somewhat elevated temperatures such as about 50° C. to about 150–175° C. with the impregnated sheet stock passing through or hanging free in an oven or other suitable equipment. The resinification is arrested before infusible products occurs by cooling below about 40° C. The single sheet or a plurality of the impregnated sheets obtained by superposing the sheets together are then cured in a heated press at temperatures of 125° C. to about 200° C. under a pressure of about 25 to 500 or more pounds per square inch.

The base material used in making the reinforced products may be of any suitable type, such as glass cloth and matting, paper, asbestos, mica flakes, cotton bats, duck muslin, canvas, synthetic fibers, such as nylon, Dacron and the like. The materials may be in the form of fibers, filaments, etc. such as in the case of filament winding, or may be in the form of sheet material. It is usually preferred to utilize woven glass cloth or fibers that have been given prior treatment with the well known finishing or sizing agents, such as chrome methacrylate, vinyl trichlorosilane and the like.

As noted above, the resulting laminated products will be hard insoluble infusible products having outstanding elecated temperature flexural strength, solvent resistance and heat resistance. They can be used for many important applications as table tops, building parts, containers, airplane and missile parts and the like.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight. The polyether referred to by letter, such as Polyether A, are those disclosed in U.S. 2,633,458.

EXAMPLE I

This example illustrates the preparation of a reinforced laminated product having superior properties using a condensate of Polyether A (i.e., glycidyl polyether of 2,2-bis(4-hydroxyphenyl)propane and a mixture of methylene dianiline and aniline, and dicyandiamide as curing agent.

89.7 parts of Polyether A was combined with 5.3 parts of aniline and 5.0 parts of methylene dianiline. The mixture was heated to an initiation temperature of 120° C. over a period of 35 minutes. The temperature was then allowed to exotherm to 185° C. over a period of 20 minutes. The mixture was held at 185° C. for 42–48 minutes and then poured out and cooled to room temperature. The resulting solid product had a softening point of 83° C. and a WPE of 417.

The above product was used to prepare a laminating varnish containing dicyandiamide as curing agent according to the following formulation:

| Component: | Parts by weight |
|---|---|
| Above-noted condensate | 100 |
| Dimethyl ketone | 43 |
| Methyl Cellosolve | 36 |
| Dicyandiamide | 4 |
| Benzyldimethylamine | 0.2 |

The above-noted components were combined by stirring. The resulting varnish had good storage stability and exhibited no significant viscosity increase even after six days at ambient temperature.

The above-noted varnish was brush applied in a low relative humidity or (less than 25% relative humidity), to Volan A finish glass cloth. The coated cloth was then placed in a 150° C. oven for advancement and then cut to form 8" x 10" 8-ply parallel lay-ups in this same low humidity area. The lay-ups were then given 2 minutes contact pressure in a 350° F. press followed by 10–25 minutes at 200 p.s.i. and 350° F. The laminates were then cooled to 150° F. under pressure before removal from the press, in about 8 to 9 minutes.

The laminates were then tested for physical properties and the results shown in the table below in comparison to a similar laminated product prepared from a straight glycidyl polyether of 2,2-bis(4-hydroxyphenyl)propane and dicyandiamide. Properties of similar laminates prepared under ambient humidity are shown in Table No. II.

The above system is characterized by the shorter advancement time (e.g. time to B stage), shorter press time to secure good properties and is less affected by humidity.

EXAMPLE II 85.0 parts of Polyether A was combined with 11.3 parts of aniline and 3.7 parts of methylene dianiline. The mixture was heated to an initiation temperature of 107° C. over a period of 19 minutes, the mixture exothermed to 240° C., was held at that temperature for 2 minutes, and then dumped and cooled to room temperature. The resulting product had a WPE of 790 and a softening point of 116–121° C. This product is used to prepare a laminate as in Example I. Related results are obtained.

EXAMPLE III 85.30 parts of Polyether A, 13.06 parts of aniline, 1.14 parts of methylene dianiline were mixed together and to this mixture was added 0.5 parts of salicyclic acid. This mixture was heated to 50° C. over a period of 15 minutes and then exothermed to 167° C. over a period of 35 minutes. The temperature was held at 167° C. for 7 minutes. The reaction was dumped and allowed to cool to room temperature. The product was a solid resin having a softening point of 95–105° C. and a WPE of 708.

TABLE I
[Laminate Conditions and Properties—Low Humidity (<25%)]

| Resin | Prepreg. Advancement at 150° C., min. | Prepreg., percent Resin | Flow,[1] percent w. | Laminate, percent Resin | Press Time at 350° F., min. | Flexural Strength, p.s.i. RT | Flexural Strength, p.s.i. 225° F. | Retention, percent | Peel Strength,[2] 1 oz. Cu, lb./in. Before Solder Dip | Peel Strength,[2] 1 oz. Cu, lb./in. After 1 min., 500° F. Solder Dip |
|---|---|---|---|---|---|---|---|---|---|---|
| Precondensate Resin | 3 | 38.2 | 2.8 | 36.5 | 25 | 78,000 | 54,000 | 69.2 | 10 | 10 |
| Glycidyl ether of 2,2-bis(4-hydroxyphenyl)propane | 6 | 39.1 | 1.1 | 38.4 | 25 | 79,000 | 37,600 | 47.6 | 11 | 12 |

[1] [(Wt. of prepreg.—wt. of trimmed laminate) 100]/(wt. of prepreg.) = percent flow.
[2] 90° C. angle pull.

TABLE II
[Laminate Conditions and Properties—Ambient Humidity (45–55%)]

| Resin | Prepreg. Advancement at 150° C., min. | Prepreg., percent Resin | Flow, percent w. | Laminate, percent Resin | Press Time at 350° F., min. | Flexural Strength,[1] p.s.i. RT | Flexural Strength,[1] p.s.i. 225° F. | Retention, percent | Solder Dip,[2] 500° F. for 1 min., days at 50% RH and 72° F. before testing 23 | Solder Dip,[2] 500° F. for 1 min., days at 50% RH and 72° F. before testing 30 |
|---|---|---|---|---|---|---|---|---|---|---|
| Precondensate Resin | 4 | 44.1 | 6.1 | 40.5 | 25 | 75,600 | 47,000 | 62.2 | Pass | Pass |
| Glycidyl ether of 2,2-bis(4-hydroxyphenyl)propane | 7 | 45.4 | 9.3 | 39.8 | 25 | 81,500 | 23,400 | 28.8 | do | Fail |

[1] Parallel to warp.
[2] To pass, there must be no delamination or blistering and very little discoloration.

The above product is used to prepare a laminate as in Example I. Related results are obtained.

EXAMPLE IV 91.8 parts of Polyether A was combined with 2.8 parts of metaphenylene diamine and 5.4 parts of aniline. The mixture was heated to 116° C. over a period of 18 minutes and allowed to exotherm to 189° C. over a period of 36 minutes. The product was then cooled to room temperature. The resulting product was a solid acetone-soluble resin having a WPE of 412 and a melting point of 79° C.

The above product was used to make a laminate as in Example I. Related results are obtained.

EXAMPLE V 85.8 parts of Polyether A was combined with 0.7 part of hexamethylene diamine and 13.5 parts of aniline. The mixture was heated to 110° C. over a period of 21 minutes and then exothermed to 213° C. over a period of 23 minutes. The product was then cooled to room temperature. The resulting product was a solid acetone-soluble resin having a WPE of 731 and a softening point of 94–101° C.

The above product is used to make a laminate as in Example I. Related results are obtained.

I claim as my invention:

1. An impregnated product capable of being converted on heat to an insoluble infusible product comprising a fibrous material impregnated with a liquid mixture of (1) an acetone-soluble highly reactive epoxy-containing condensate of (a) a polyepoxide having more than 1 vic-epoxy group, and (b) a polyfunctional amine possessing more than two active hydrogen attached to amino nitrogen, and (2) an epoxy resin curing agent different from the polyfunctional amine in the condensate.

2. A product as in claim 1 wherein the polyepoxide used to make the condensate is a polyglycidyl ether of a polyhydric compound of the group consisting of polyhydric alcohols and polyhydric phenols.

3. A product as in claim 1 wherein the polyfunctional amine is an aromatic polyamine containing 3 to 8 active hydrogen atoms.

4. A product as in claim 1 wherein the condensate has a softening point of at least 50° C. and a weight per epoxide of at least 300.

5. A product as in claim 1 wherein the curing agent is dicyandiamide.

6. A product as in claim 1 wherein the base material is glass cloth.

7. A product as in claim 1 wherein the polyfunctional amine is meta-phenylene diamine.

8. A product as in claim 1 wherein the curing agent is (1) 0.5 to 10 parts of dicyandiamide per 100 parts of condensate, and (2) .01 to 5 parts of a tertiary amine.

9. A product as in claim 1 wherein the treating mixture contains a volatile organic solvent.

10. A reinforced plastic product obtained by heating the product of claim 1 to a temperature of 50° C. to 200° C. and a pressure of 100 p.s.i. to 2,000 p.s.i.

References Cited

UNITED STATES PATENTS

| | | | |
|---|---|---|---|
| 3,409,592 | 11/1968 | Landau et al. | 260—47 |
| 3,409,591 | 11/1968 | Landau et al. | 260—47 |
| 3,409,590 | 11/1968 | Landau et al. | 260—47 |
| 2,992,193 | 7/1961 | Porret et al. | 260—2 |
| 2,970,983 | 2/1961 | Newey | 260—47 |
| 2,965,607 | 12/1960 | Martin et al. | 260—47 |
| 2,965,517 | 12/1960 | Albrecht et al. | 117—138.8 |

ROBERT F. BURNETT, *Primary Examiner.*

M. A. LITMAN, *Assistant Examiner.*

U.S. Cl. X.R.

117—161; 161—93, 184, 185; 260—2, 47